United States Patent [19]
Ranocha et al.

[11] 3,884,744
[45] May 20, 1975

[54] APPARATUS FOR WELDING SHOE PARTS

[75] Inventors: Jaromir Ranocha; Dusan Repka; Bohumil Machu, all of Gottwaldov, Czechoslovakia

[73] Assignee: Zavody elektrotepelnych zarizchi, hardoni podnik, Prague, Czechoslovakia

[22] Filed: May 31, 1973

[21] Appl. No.: 365,448

[52] U.S. Cl. ............... 156/351; 156/380; 156/367; 156/583
[51] Int. Cl. ...................... B29c 27/04; B30b 15/34
[58] Field of Search .......... 156/380, 583, 580, 272, 156/351, 358, 359, 365, 367, 502; 12/21; 100/259, 257, 53; 92/8, 10, 13

[56] References Cited
UNITED STATES PATENTS

| | | | |
|---|---|---|---|
| 2,479,375 | 8/1949 | Langer | 156/380 |
| 3,036,337 | 5/1962 | Burnham | 100/259 |
| 3,250,210 | 5/1966 | Richard et al. | 100/53 |
| 3,432,374 | 3/1969 | Packard et al. | 156/583 |
| 3,684,620 | 8/1972 | Hoffmann | 156/380 |
| 3,697,354 | 10/1972 | Brown et al. | 156/380 |
| 3,738,887 | 6/1973 | Hoffmann | 156/380 |

Primary Examiner—Charles E. Van Horn
Assistant Examiner—M. G. Wityshyn
Attorney, Agent, or Firm—Murray Schaffer

[57] ABSTRACT

Apparatus for the high frequency welding of shoe parts and the like includes a table for receiving the shoe parts, a frame extending above the table and a plurality of pressure cylinders arranged on said frame and having piston rods extending downwardly toward the table. Each of the piston rods are provided with heads adapted to removably mount both welding electrodes and clamp members. The outer heads of each of the piston rods are provided with a spring contact extending therefrom while a countercontact is removably arranged on a terminal board mounted adjacent to the pistons on the frame of the apparatus. The spring and countercontacts are adapted to be connected in series with the high frequency energizing circuit and the source of high frequency energy. The terminal board itself is arranged on the frame level with the bottom dead center of the electrodes when the piston rods are extended outwardly at their greatest distance. Thus energization of the high frequency circuit will take place only when selected ones of the pistons are provided with both the spring and countercontacts and when those pistons are extended.

5 Claims, 4 Drawing Figures

APPARATUS FOR WELDING SHOE PARTS

BACKGROUND OF THE INVENTION

The present invention relates to apparatus for the production of shoe uppers and particularly for the high frequency (HF) welding of natural and synthetic leather parts to form shoe upper members.

The conventional machines used for the welding of shoe upper parts are usually adapted for the welding of relatively narrow range of seams. These machines were generally provided with several pressure cylinders, the piston rods of which were arranged so as to have a single purpose either for the fastening of a welding electrode or for the fastening of a clamp to hold the leather members. The pressure cylinders were generally actuated via an electro magnetic valve which regulated the flow of pneumatic or hydraulic pressure to the cylinders. The electrical connections for these values as well as for the high frequency circuit to the electrode were also arranged to have a unitary or single purpose and it was not possible to change any of the electrical connections. Such an arrangement was disadvantageous for several reasons. The first being obvious in view of the variety of numbers and shapes of shoe upper parts to be welded limited the machines to very narrow applications and it was impossible to adapt the machines to more than one or two varieties. The welding electrodes of the conventional machines were permanently incorporated into the high frequency circuit and the only adjustability lay in the use of a timer relay which limited the energization of the electrodes to a give time period only. The connection of a timer relay itself was not always convenient since in the case of timer relay failure the welding electrodes would dwell under high frequency voltage beyond the given time and even when moved out of their pressing or welding position. In this latter condition the machine operator himself was exposed to the danger of being burnt.

A further disadvantage lay in the fact that the pressure cylinders of the conventional machines were not adjustable with respect to the table on which the work pieces were to lie. The only adjustability was in the setting of the top and bottom dead centers of all of the welding electrodes and the clamps holding the material simultaneously. In many instances the shape and thickness of the material and of the seams to be welded vary and the quality of the weld depends upon the uniform pressing of the parts whether they be of the same or different shape or thickness.

Still another disadvantage of the conventional machines is that the actuation of the piston rod from its top to bottom dead center positions is conducted at relatively high speed which speed remains constant during the entire stroke of the piston rod. Thus, the work piece is often undesirably deformed by the shock of the piston rod descending on it. Some of the known machines have a "stop" safety switch by which the welding electrodes and the clamps are turned back on their dead centers in any phase of the working cycle. This switch is usually positioned separately from the welding electrode operating means, that is, it is separately manually controlled. The manual controlling of the stop safety switch causes a loss in time particularly when the operator is concerned with other functions of the machine. As a result the operator is in danger of injury to himself or wasting of the material so welded.

It is the object of the present invention to provide apparatus for the welding of shoe upper parts which overcomes the disadvantages and defects of the prior art.

It is particularly the objective of the present invention to provide apparatus for the welding of shoe upper parts through the use of high frequency welding techniques in which the flow of high frequency current and voltage can be made to selected electrodes and that such selection may be easily adjustable and selectible.

It is a further object of the present invention to provide apparatus for the high frequency welding of shoe parts wherein the stroke of the piston rods can be adjustable for varying shapes and thicknesses of a work piece.

It is a further object of the present invention to provide apparatus for the high frequency welding of shoe parts which is significantly more universal and multi purpose than those conventional devices.

It is a further object of the present invention to provide apparatus for the high frequency welding of shoe uppers where an undesirable shock on the movement of the piston rod is obviated.

It is a further object of the present invention to provide apparatus for the high frequency welding of shoe upper parts having an automatic cyclical operating system and mechanism.

These objects, other objects, as well as numerous additional advantages, will be seen from the following disclosure of the preferred embodiment of the present invention.

SUMMARY OF THE INVENTION

According to the present invention apparatus for the high frequency welding of shoe upper parts and the like is provided comprising a table for receiving the shoe parts, a frame extending above the table and a plurality of pressure cylinders arranged on said frame and having piston rods extending downwardly toward the table. Each of the piston rods are provided with heads at their outward end which are universal in nature and which are adapted to removably mount both welding electrodes and clamp members of varying shapes and sizes. The outer heads of each of the piston rods are provided with a spring contact extending therefrom while a countercontact is removably arranged on a terminal board mounted adjacent to the pistons on the frame of the apparatus. The spring and countercontacts are adapted to be connected in series with the high frequency energizing circuit and the source of high frequency energy. The terminal board itself is arranged on the frame level with the bottom dead center of the electrodes when the piston rods are extended outwardly at their greatest distance. Thus energization of the high frequency circuit will take place only when selected ones of the pistons are provided with both the spring and countercontacts and when these pistons are extended into their pressure contact with the work piece.

The movement of the cylinders and the operation of the electrodes are controlled and regulated by an integrated circuit which provides for the automatic cyclical operation of the machine. The electrodes are themselves controlled by a foot control which initiates the working cycle. The foot control is connected in a toggle circuit which has a governing relay, the contacts of which control the several electro magnetic valves actuating the pressure cylinders. The relay contacts are set within a circuit controlled by a manually operable switch so that a predetermined combination can be selected and chosen to effect a predetermined operative array.

The piston rods of each of the pressure cylinders are further provided with microswitches which are mounted so as to be closed only on the movement of the piston rods to their most outward extent. The microswitches are set within the high frequency energizing circuit and are provided only in those piston rods which have welding electrodes connected to it. These microswitches themselves may be arranged in the circuit of the timer relay so that upon the expiration of the given period of time the microswitches open allowing the electrodes to cool.

Further in accordance with the present invention each of the pressure cylinders themselves are provided with its individual housing which is reciprocally mounted and adjustable on the frame of the machine independent of each of the other pressure cylinders. Preferably the housing is mounted on an elongated screw and is provided with a regulating nut allowing its adjustability. In addition, all of the cylinders are mounted within a common housing which is itself adjustably mounted on the frame of the machine.

Further, in accordance with the present invention each of the pressure cylinders is provided with an internal bore in which the piston rod reciprocates. The bore is provided at both of its frontal ends with concentrically enlarged wells, the diameters of which are greater than that of the piston rod from which throttling ports extend outwardly toward the source of pneumatic or hydraulic fluid. The piston rod itself is provided with a piston which engages the inner surface of the cylinder. The piston is provided with shoulders or steps formed on both its sides, the diameters of these steps being equal to those of the cylindrical wells formed in the cylinder. The steps are adapted to enter into the cylindrical well on reciprocation of the piston rod thus forcing liquid in the system through the throttling port associated with its direction of movement so as to bleed the fluid and allow the pistons to come to a slow stop position without the creation of any shock or hammer.

According to the present invention the welding electrodes and/or the clamps which may be mounted to the universal heads need not be constantly changed in order to vary the mode of welding or the position of the seam to be welded. A multi position switch is inserted in the circuit of the apparatus which is adapted to provide several predetermined arrays of operation and predetermined chosen combinations for the actuation of selected cylinders and the energization of selected electrodes. In every combination however the operation is controlled by a single control switch such as the foot controller. The foot controller serves moreover as an emergency "stop" switch which enables the complete shut down of the machine and return of the cylinders and electrodes to their normal unactuated positions merely by treading or stepping a second time upon the switch controller. The electric circuit contains several relays which are connected in the chosen combinations to actuate the pressure cylinders.

Full details of the present invention is given in the following description and shown in the accompanying drawings.

DESCRIPTION OF THE INVENTION

Figure 1:
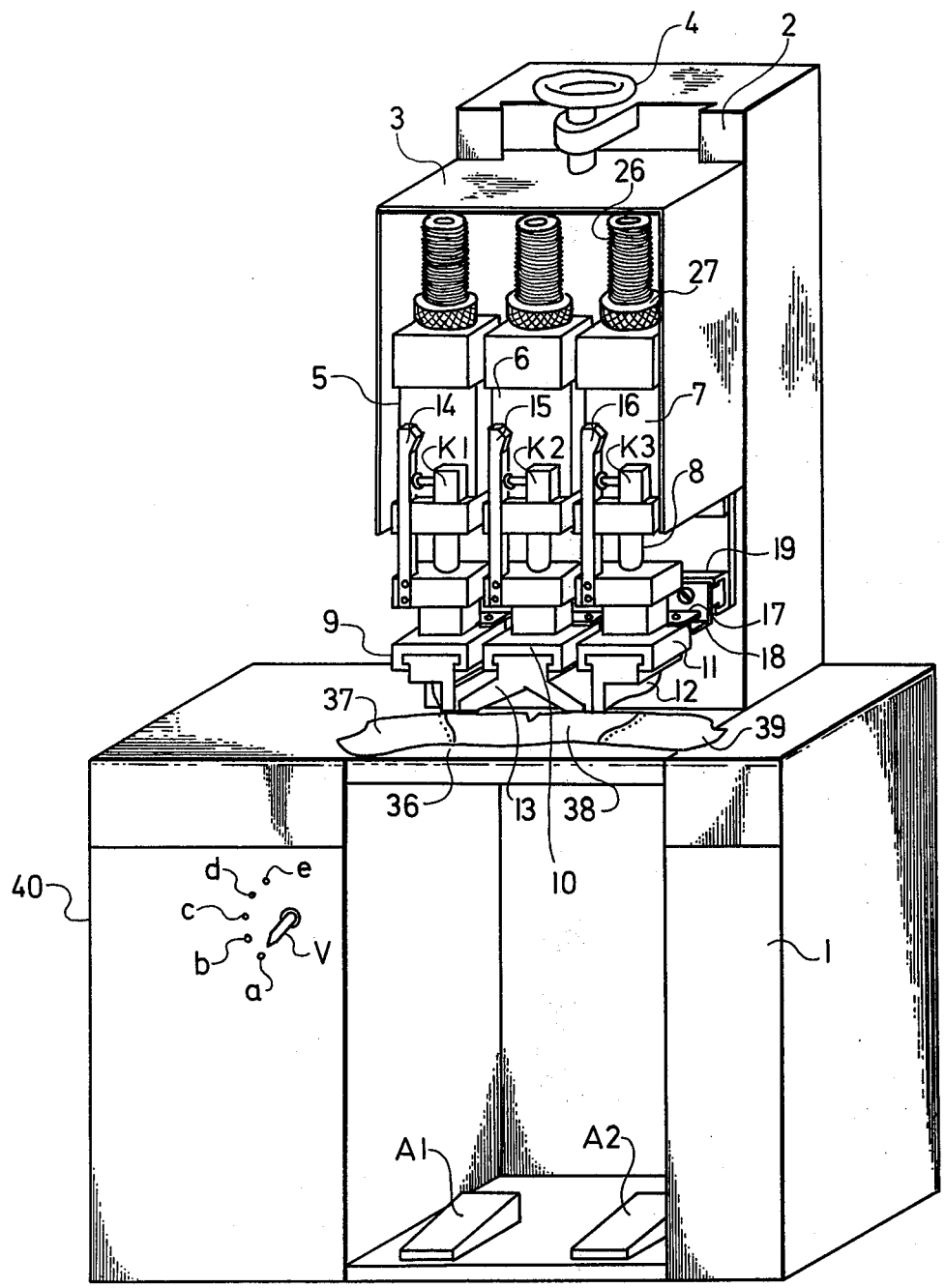
FIG. 1 is a perspective view of the entire apparatus.
Figures 2, 3:
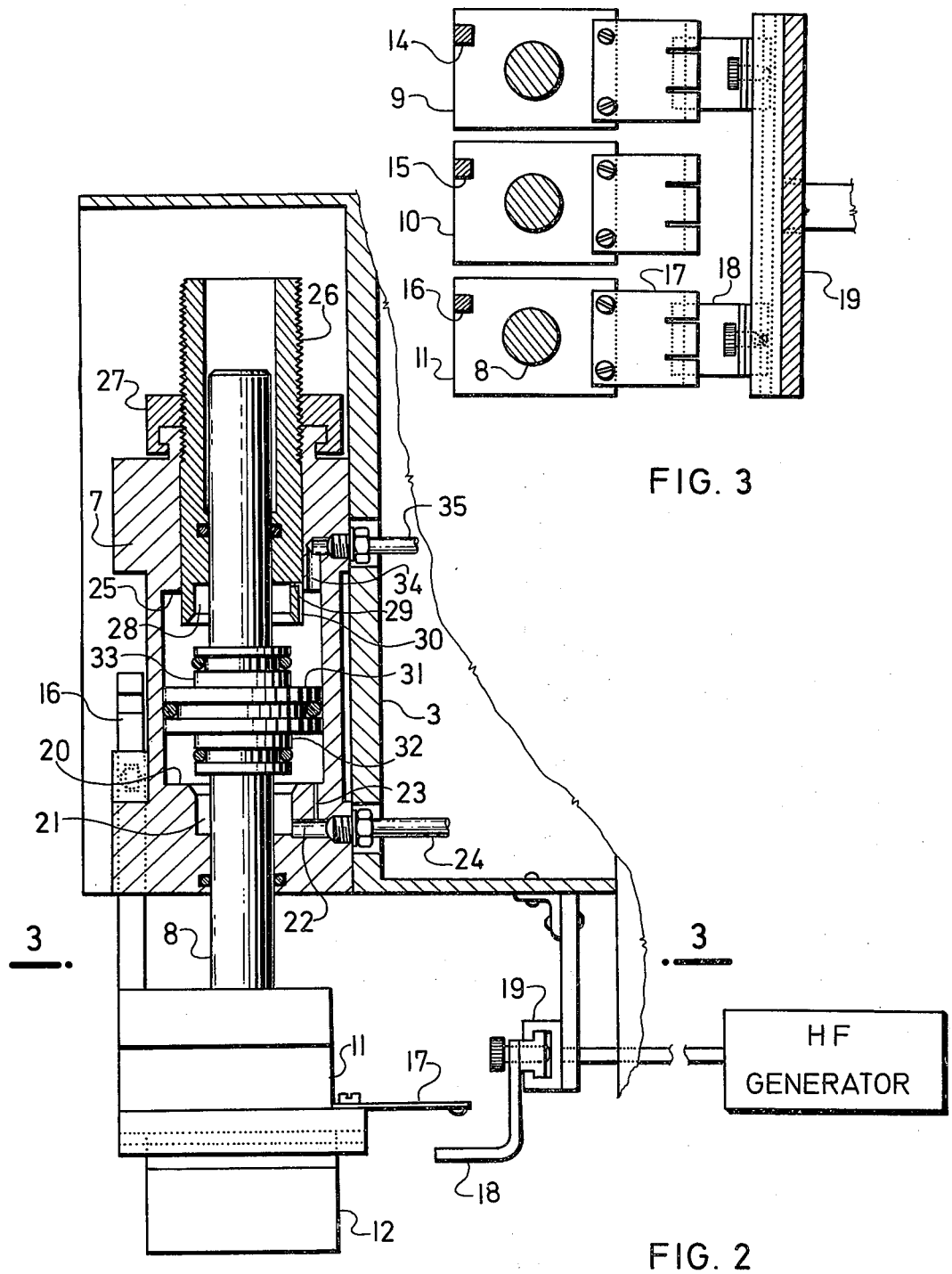
FIG. 2 is a longitudinal section through a single pressure cylinder.
FIG. 3 is a section along lines 3—3 of FIG. 2

As seen in FIG. 1 the machine as a whole comprises a frame structure having a base 1 and a vertical standard 2 extending upwardly therefrom. A movable housing support 3 is arranged on the standard 2 and is provided with an adjustable screw mechanism 4 by which it may be positioned adjustably above the base 1. Mounted in the housing support 3 are a plurality of pressure cylinders 5, 6 and 7 (only three are shown for illustration although any number may be employed). Each of the pressure cylinders as seen in FIG. 2 has an axially reciprocal piston rod 8, the end of which is provided with a universal head. The cylinders 5, 6 and 7 are provided with heads 9, 10 and 11 respectively. Each of the universal heads are adapted to removably mount an electrode element and/or a clamp element of any shape or size. In the apparatus illustrated the heads 9 and 11 corresponding to the end pressure cylinders 5 and 7 are provided with welding electrodes 12 while the center or middle head 10 corresponding to the pressure cylinder 6 is provided with a clamp element 13. Mounted upwardly from each of the heads 9, 10 and 11 adjacent the associated pressure cylinder is an elongated trip cam 14, 15 and 16 respectively. Mounted on each of the pressure cylinders is a microswitch K1, K2 and K3 respectively, each having a contact arm engaging the surface of the trip cam associated with it. Each of the trip cams 14, 15 and 16 have an enlarged surface at their uppermost ends which are caused to depress the arm of the associated microswitch to thereby close the microswitch when the piston rod is in its downmost or extended position.

Further, each of the universal heads 9, 10 and 11 as seen in FIG. 2 are provided with a laterally extending spring contact 17 directed toward the vertical standard so as to align with a countercontact 18 adjustably and removably positioned on an elongated terminal board 19 fixed to the standard. As seen in FIG. 2 the countercontact is adjustable transversely of the cylinders so as to be selectively positioned beneath a selected one of the spring contacts 17. Thus, as seen in FIG. 3 the two end pressure cylinders 9 and 11 have associated countercontacts 18 while the central piston pressure cylinder 10 to which only the clamp is attached is not provided with the countercontact 18. In like manner the spring contacts 17 themselves can be removably mounted on the universal head since as seen in the Figures they are in fact mounted by suitable screw means. The terminal board 19 is mounted to the frame of the machine so that the contacts 17 and 18 meet and mutually contact each other when the piston rod is at its outermost extension and the electrode elements 12 are in their bottommost dead center position. The contacts 17 and 18 are adapted via mesne connections to be connected to the source of high frequency energy so that the circuit connecting the source of high frequency energy to the electrode 12 is only closed and operable when the piston is in its extended most position and when the electrode 12 is thus pressed against the work piece.

Each of the pressure cylinders, as seen in FIG. 2 with respect to the cylinder 7, has an enlarged internal bore which at its bottom frontal end 20 narrows concentrically with the piston rod 8 to form a cylindrical well 21 which has a diameter larger than that of the piston rod 8. An inlet port 22 communicates with the well 21 and a narrow or thin throttling port 23 extends axially from the port 22 into the enlarged section of the bore of the cylinder. Connected to the inlet port 22 is a conduit 24 leading from a source of pneumatic or hydraulic pressurized fluid (not shown). The piston rod extends outwardly of the lower end of the cylinder and is surrounded by a suitable seal ring. The upper frontal end of the enlarged bore of the cylinder extends radially inwardly to form a shoulder 25 through which is mounted a cylindrical sleeve 26 in which the upper end of the piston rod 8 is slidably received. The outer surface of the sleeve 26 is provided with a helical screw thread to which an adjusting nut 27 is threadably secured. The adjusting nut 27 has a radially extending lip which extends over a conforming collar formed at the upper end of the cylinder.

Thus, on rotating the adjusting nut 27 the sleeve 26 may be caused to reciprocally adjust itself axially within the bore of the cylinder 7. The axial movement of the sleeve 26 varies the axial extent of the cylinder itself and thus varies the extent of traverse of the piston rod 8. As a result, each of the pressure cylinders and piston rods are individually adjustable with respect to the frame.

The inner end of the sleeve 26 is provided with a cylindrical well 28 having a larger diameter than that of the piston 8. Extending from the bottom of the well 28 is a very thin throttling bore 29 communicating with an axial bore 30 opening into the enlarged portion of the cylinder. Fixed centrally along the piston rod 8 is a piston 31 which conforms in diameter to the enlarged bore of the cylinder. The piston 31 is flanked on each of its sides with a smaller step 32 and 33 respectively. Each of the steps 32 and 33 conform in diameter to the wells 21 and 28 formed at the frontal bottom end of the cylinder and in the sleeve 26 respectively. The piston member 31 as well as its flanking members 32 and 33 are provided with suitable O-ring seals or the like. The flanking members 32 and 33 are adapted to seat within the well portions 21 and 28 respectively on movement of the piston in its axial direction. At the upper end of the central bore, the cylinder is provided with an inlet-outlet port 34 to which a conduit 35 is connected leading to the source of pressure. As will be seen from FIG. 2 the inlet port 22 communicates with that portion of the cylinder below the piston 31 and on the side of the flanking member 32 while the inlet port 34 communicates with the upper portion of the cylinder bore on the side of the piston 31 associated with the upper flanking member 33. Selective application in drainage of fluid pressure through the ports 22 and 34 will cause the cylinder piston to be reciprocated within the cylinder.

Each of the cylinders 5, 6 and 7 are similarly constructed and consequently the showing of FIG. 2 of only one of the pistons is illustrative of the construction of all.

The base 1 of the frame forms a flat table 36 beneath the pressure cylinder assembly on which several parts of the shoe upper can be assembled. As seen in FIG. 1 the shoe upper comprises three parts 37, 38 and 39 which are adapted to be welded together with two seams corresponding to the electrodes 12 located in the universal housings 9 and 11. Beneath the table 36 a foot controller A1 and a foot switch A2 are arranged so as to be operated by the operator of the machine in order to initiate the cyclical operation. Mounted in the lower portion or base 1 of the frame is an electrical assembly 40 which is shown in schematic detail in FIG. 1. Extending outwardly of the face of the base 1 is a multi position switch V which is provided with a plurality of individually selectible positions $a$, $b$, $c$, $d$ and $e$.

Figure 4:
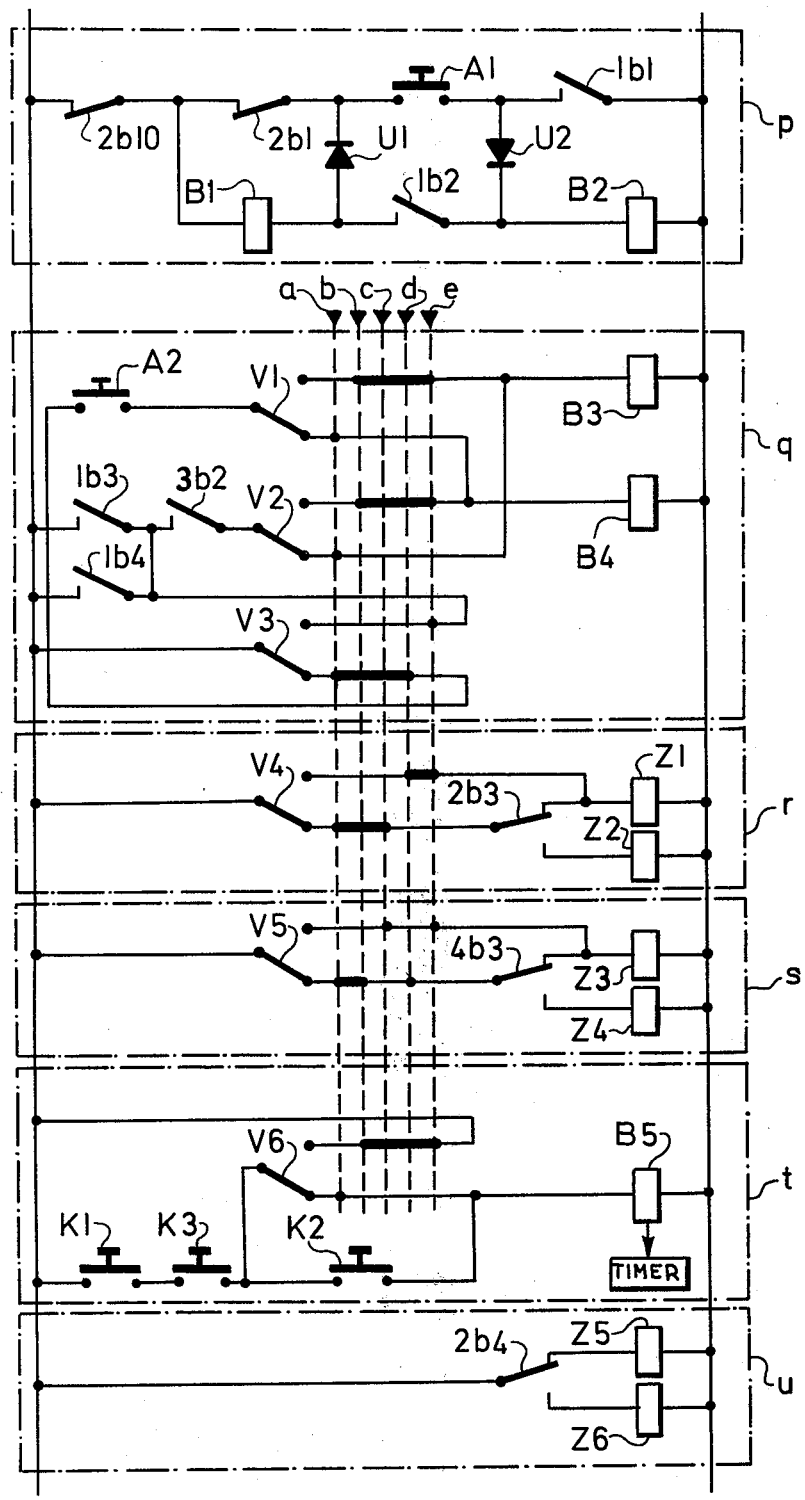
FIG. 4 is a diagramatic representation of the electric circuit employed in the illustrated machine.

The control and regulating circuit for automatic cyclical operation of the apparatus is seen schematically in FIG. 4. The circuit comprises a plurality of partial circuits $p$, $q$, $r$, $s$, $t$ and $u$ which control the respective operations of the machine. Each of the pressure cylinders 5, 6 and 7 are activated to move up by an electro magnet or solenoid operated valve Z1, Z5, and Z3 respectively and to move downwardly pressing the electrode against the work piece by another electro magnetic or solenoid operated valve Z2, Z6 and Z4 respectively. The circuit furthermore includes a plurality of solenoid relays B1, B2, B3, B4 and B5 together with their contacts which are indicated in the drawing by having a prescript denoting their contact position. In addition, the multi position switch consists of a relay having a plurality of contacts V1 through V6 in addition to the circuit selections indicated by the positions $a$ through $e$. All of the relay contacts and switches are shown in FIG. 4 in their normally biased position.

As seen in FIG. 4 the foot controller A1 is connected into the toggle circuit $p$ which itself comprises the normally closed contact $2b10$ and $2b1$, the normally open contacts $1b1$ and $1b2$, the winding of the relay B1 and the winding a relay B2 which comprises the circuit governing relay. A pair of diodes U1 and U2 which permit only unidirectional flow of current are interposed in parallel across the relays B1 and B2 in opposite directions to each other. The toggle circuit is adapted to be actuated by the foot controller into two stable states in addition to the controlling on-off operation of the apparatus via the foot controller A1 or the independent contact $2b10$. The partial circuit $q$ is a sequence circuit regulating the movement of the pistons and the clamping of the electrodes via the subsequent partial circuits $r$, $s$ and $u$ and the welding via the subsequent circuit $t$. The partial circuit $q$ contains connecting relays B3 and B4, as well as the contacts V1, V2 and V3 of the multi position switch. The pedal operated clamp control switch A1 by which the operator controls the clamping is connected in series with the switch contact V1 and V3 across each of the positions $a$, $b$, $c$ and $d$ of the multi position switch. In series with the contact V2 is a normally closed contact $3b2$ and a normally opened contact $1b3$ to which is also connected in parallel a normally open contact $1b4$. The partial circuit $r$ is adapted to control the cylinder 5 and contains a pair of electro magnetic valves Z1 and Z2 in series with the contact V4 and the switching $2b3$ of the relay B3. The partial circuit $s$ is adapted to control the operation of the pressure cylinder 7 and is similarly arranged with the paired electro magnetic valves Z3 and Z4 which are in series with the contact V5 and a switching contact $4b3$ of the relay B3. The partial circuit $t$ is adapted to control the high frequency current source and the delivery of the current to the respectively selected electrodes. The partial circuit $t$ includes the winding of the relay B5, the contact V6 as well as the microswitches K1, K2 and K3.

The high frequency control circuit $t$ also has its relay B5 connected to a suitable timer relay or timing circuit which are not shown. The final partial circuit $u$ is adapted to control the movement of the cylinder 6 and includes the electro magnetic valve Z5 and Z6 which are connected via the switching contact 2b4 of the relay B4. The positions of the circuits $r$, $s$ and $u$ are shown to illustrate the fact that cylinders 5 and 7 in the illustrated embodiment carry working electrodes while the cylinder 6 which is interposed between the two carries merely the clamp device 13. Consequently the circuit $u$ is not connected via a contact of the multi position switch $v$ since the cylinder 6 in this embodiment is only adapted to move up and down into the clamping position. It will be obvious to those skilled in the art that the arrangement of the circuits and the operation of the electro magnetic valves can be interchanged as desired. The circuit is of course connected to a source of current as indicated by the polarity symbols.

As seen in FIG. 4 the positions of the contacts V1 through V6 and the points $a$ through $e$ of the multi position switch V form a matrix which upon switching of the contacts V1 through V6 automatically select a particular operating pattern. The operating pattern can of course be changed by modifying the contact of points $a$ through $e$ in the particular circuits in which they are shown. In the FIG. 4 the positions of points $a$ through $e$ are shown in the selection necessary for the illustration of the present embodiment. Regarding this diagramatic representation it is obvious that it will be possible to choose from among the following combinations of operation merely by switching the multi position switch V from one to another of the positions $a$, $b$, $c$, $d$ or $e$. As for example, the illustrated selections are as follows:

At point $a$ — the pressure cylinders 5 and 7 may be chosen for welding, and the pressure cylinder 6 is chosen for clamping action only;

At point $b$ — the pressure cylinders 5 and 7 are chosen for clamping only while the pressure cylinder 6 may be chosen for welding action;

At point $c$ — the pressure cylinder 5 is chosen for clamping, the pressure cylinder 6 is chosen for welding, and the pressure cylinder 7 remains at rest;

At point $d$ — the pressure cylinder 5 is at rest, the pressure cylinder 6 is chosen for welding, and the pressure cylinder 7 is chosen for clamping;

At point $e$ — the pressure cylinders 5 and 7 remain at rest and the pressure cylinder 6 is chosen for welding.

In operation the present apparatus functions as follows:

Assuming that the apparatus is to be used in the selected combination of pressure cylinders 5, 6 and 7 corresponding to the point a on the multi position switch V this is the situation shown in the drawings and in the schematic circuit. Before starting work the operator fastens the welding electrodes 12 to the universal heads 9 and 11 and fastens the clamp 13 to the centrally located universal head 10. The operator thereafter sets the countercontacts 18 on the terminal board under the spring contacts 17 of only the pressure cylinders 5 and 7 since these are only to be connected to the high frequency current source. Simultaneously he leaves the position beneath the spring contact 17 of the central or the middle pressure cylinder 6 free. The multi position switch V is of course positioned at the point $a$. The operator thereafter places the central shoe upper part 38, as seen in FIG. 1, on the table 36 and treads down upon the pedal switch A2 keeping it in its depressed position. Thus the circuit $q$ is closed through the contacts V3 and V1 of the multi position switch V and through the winding of the connecting relay B4. Simultaneously contacts 1b4 and 2b4 switch. The closing of the switching contact 2b4 on the electro magnetic valve Z6 induces pressure medium to be supplied to the pipe 35 (FIG. 2) above the piston 31 of the pressure cylinder 6 causing the piston 8 to extend itself. Before reaching the bottom stroke the flanking portion 32 of the piston 31 enters the cylindrical well 21 and the pressure medium in the cylinder is forced to escape through the throttling port 23 being closed off from existing via the conduit 22 by the action of the seal ring on the flanking portion 32 against the wall of the well 21. Thus the speed of movement of the piston rod 8 is suitably reduced toward the end of its sliding movement. As this begins to happen the clamp 13 connected to the piston rod 8 begins to press down on the shoe upper part 38 holding it firmly to the table 36. Thereafter the operator places the remaining shoe upper portions 37 and 38 in position for them to be properly welded to the central portion 38. He thereafter treads down upon the foot controller A1 to set the machine into the automatic welding cycle.

Upon actuating the foot controller switch A1 the toggle circuit $p$ is switched over into its first stable state by closing itself through the normally closed contacts 2b10 and 2b1, foot controller A1, and the diode U2 through the governing relay B2. The operator may now release his foot from the foot controller switch A1 since in the meantime the closing contact 1b2 of the governing relay B2 has switched so that the toggle circuit $p$ is left in its closed position through the relay B1. As a result of the actuation of the relay B2 the normally open contact 3b2 closes and energizes the relay B3 through the contact 1b4 and the contact V2 in the partial circuit $q$. As a result of the energization of the relay B3 the switching contacts 2b3 and 4b3 switch over to energize the electro magnetic valves Z2 and Z4 of the pressure cylinder circuits $r$ and $s$, thus supplying pressure medium to the cylinders 5 and 7 above their respective pistons 31. The pistons of these cylinders 5 and 7 thus simultaneously slide the welding electrodes 12 downwardly into contact with the work pieces 37, 38 and 39. Before reaching their bottom stroke the pistons 31 of each of the pressure cylinders 5 and 7 are reduced in speed in the same manner as was described with the operation of the cylinder 6 carrying the clamp 13. That is, their lower flanking portions 32 enter into the wells 21 of their respective cylinders blocking drainage of the fluid via the conduit 22 and permitting only the throttling drainage through the bore 23. Thus the welding electrodes 12 descend without shock to the table 26.

As soon as the welding electrodes 12 reach their bottom stroke, the spring contacts 17 bear against their countercontacts 18 and then only after the welding electrodes 12 bear against the shoe upper parts 37, 38 and 39, the microswitches K1 and K3 are tripped by the levers 14 and 16 respectively. This closes in common the electric circuit $t$ through the contact V6 and the relay B5 causing the flow of the high frequency current source to the respective electrodes. As noted earlier, the relay B5 controls a not shown timing relay or timing circuit. This timing relay and circuit are conventional in the art and are not disclosed herein for the sake of velocity. Such a timing relay is adapted to first allow a period of time for the high frequency heating of the electrode to obtain proper welding and then by an interaction within its circuit or with additional relays to a period of cooling wherein the high gradually switch to a period of cooling wherein the high frequency current is reduced and yet wherein the electrodes 12 continually to grip the newly welded seam. Thereafter the timing relay or circuit controls a discharging device such as a relay which controls the breaking contact 2b10 shown in the toggle circuit p. On actuation of the relay controlling the contact 2b10 the contact 2b10 is opened thus breaking the toggle circuit and ending the entire automatic working cycle.

On the opening of the contact 2b10, the governing relay B2 is de-energized and its contact 3b2 is returned to its normally open position. This de-energizes the connecting relay B3 switching the contacts 2b3 and 4b3 to the electro magnetic valves Z1 and Z3 respectively returning the cylinders 5 and 7 to their upper positions by supplying pressure medium beneath the pistons 31. The welding electrodes are thus elevated to their uppermost stroke positions. Before reaching the top stroke position the flanking portion 33 of the piston 31 enters into the cylindrical well 28 and again blocks the flow of fluid outwardly of the drainage conduit 34 allowing the drainage of the fluid to escape only through the throttling port 29. Thus undesirable shock in the upward movement is prevented in the same manner as the shocks would be prevented in the downward stroke. Thereafter the operator may release the pedal clamp control A2 allowing the clamp 13 to move upwardly on the switching on the de-energization of the relay B4. The welded shoe upper parts 37, 38 and 39 are then removed from the table and the cycle of the working operation is completed and may be repeated utilizing other work pieces.

Should it be necessary under emergency conditions to return the welding electrodes to their uppermost position this can easily be obtained by the operator by merely treading down a second time upon the foot controller A1. This second treading operation during the automatic working cycle functions as a "stop" emergency control. By treading down on the foot controller A1, the toggle circuit is immediately switched over into its second stable state by closing itself through the normally closed contact 2b10 of the relay B1, the diode U1, the foot controller A1, and the normally open contact 1b1 which of course during the operating cycle has been closed by the energization of the relay B1. Thus the winding coil of the relay B2 is short circuited and bypassed and the relay B2 automatically deenergized and set into a state of rest. On de-energization of the relay B2 the switch contact 3b2 opens causing deenergization of the relay B3 which immediately causes reversal of the cylinders 5 and 7 carrying the welding electrodes. The final course of the action of both the electrical circuit and the mechanical devices is substantially the same as in the case of de-energizing the governing relay B2 by opening of the switch 2b10 after finishing of the entire automatic working cycle.

By switching from point a to anyone of the other points b, c, d and e of the multi position switch V the pressure cylinders 5, 6 and 7 can be selected to either clamp or to weld the upper shoe parts in any desired seam pattern.

If for example, operation corresponding to the point b of the multi position switch V is desired that is where the pressure cylinders 5 and 7 are chosen for clamping only while the pressure cylinder 6 is chosen for welding action, then the operator fastens the welding electrode to the centrally located universal head 10 and fastens the clamps to the universal heads 9 and 11. The operator thereafter sets the counter contact 18 on the terminal board 19 under the spring contact 17 of only the central pressure cylinder 6. Simultaneously he leaves the positions beneath the spring contacts 17 of the pressure cylinders 5, 7 free. The multi position switch V if of course then positioned at the point b. The operator thereafter places the shoe upper parts on the table 36 and treads down upon the pedal switch A2 keeping it in its depressed position. Thus, the circuit q is closed through the contacts V3 and V1 of the multi position switch V and through the connecting relay B3, thus being switched over the switching contacts 2b3 and 4b3 to energize the electro magnetic valves Z2, Z4 of the pressure cylinder circuit r and s. This supplies pressure medium to the cylinders 5 and 7 above their respective pistons 31. The pistons of these cylinders 5 and 7 thus simultaneously slide the clamps downwardly, the clamps in such a way begin to press down on the shoe upper parts holding them firmly to the table 36. The operator thereafter treads down upon the foot controller A1 to set the machine into the automatic welding cycle.

Upon actuation the foot controller switch A1 (in the same way as in the combination of pressure cylinders 5, 6 and 7 corresponding to the point a of the multi position switch V) the normally open contact 3b2 closes by actuation of the governing relay B2, which being now in electrical circuit q energizes the relay B4 through the normally opened contact 1B3 and the contact V2 of the multi position switch V. This switches the switching contact 2b4 of the relay B4 on the electro magnetic valve Z6 which induces pressure medium to be supplied to the pipe 35 above the piston 31 of the pressure cyliner 6 causing the piston rod 8 to extend itself. The welding electrode which is fastened to this piston rod 8 slides into its bottom stroke, but before reaching it, the spring contact 17 of the pressure cylinder 6 bears against the counter contact 18. Then, after the welding electrode is contacted with the shoe upper parts, the trip cam 15 switches the microswitch K2, which closes the electric circuit t through the contact V6 and the relay B5. Actuation of this relay B5, follows again in the same way as it does in the operation earlier described in connection with operation at point a. By actuating the last energized relay its contact 2b10 is opened thus breaking the toggle circuit p and ending the entire automatic working cycle. In such a way the governing relay B2 is deenergized and its normally open contact 3b2 opens. Thus being deenergized, the relay B4 causes its contact 2b4 to switch the electro magnetic valve Z5 for supplying pressure medium under the piston 31 of the pressure cylinder 6. The welding electrode is thus elevated to its uppermost stroke. During the welding operation the operator had of course released the pedal clamp control A2, which after deenergizing of the relay B4 allows the clamps to move upwardly. In a similar way, as it was above described for the point b of the multi point switch V, the machine functions also in all other combinations, where the central pressure cylinder 6 wears the welding electrode (that is in points c, d and e).

It is convenient to explain, that the relay B5 is energized by switching only of those micro switches which are placed on these pressure cylinders, the universal heads of which bear the welding electrodes. For example:

In combination a of the multi point switch V the circuit t is connected and thus the relay B5 is energized through the micro switches K1, K3 and the contact V6. The micro switch K2, of course, "shorts" the parallel connected branch of the circuit t, but this does not matter as it is of no consequence whether the current goes through the branch of the contact V6 or through the branch of the micro switch K2. If we imagine the situation where the pressure cylinders 5 and 7 are chosen for welding and the central pressure cylinder remains at rest, the circuit t would be closed through the micro switches K1, K3 and the contact V6 only, because the micro switch K2 would remain open through all the time of the working cycle.

On the other hand, in combinations b, c, d and e of the multi point switch V that is those cases, where the central pressure cylinder 6 is always chosen for welding and the pressure cylinders 5 and 7 are never chosen for welding, the contact V6 is switched over into its "upper" position (FIG. 4). In these cases it again does not matter if some or both of the micro switches K1, K3 are closed or not, but in every case the circuit t is closed through the contact V6 and the micro switch K2.

In any event, in all of the chosen combinations where at least one cylinder is to be operated as a clamp, the foot switch A2 must be first depressed. This depression of the foot switch A2 to initially clamp the material to the table thus ensures that the normally open contacts 1b3 and 1b4 cannot be closed until there is material on the table 36 so that the automatic working of the apparatus can be effected on an actual work piece. Thereafter the operation of the foot control A1 can be instituted. Further, in all of the chosen combinations the double pedalling of the foot controller A1 immediately provides the emergency "stop" action. Further it is only after the closing of all of the microswitches related to the cylinders having welding electrodes that the high frequency energizing circuit t can be itself closed.

The above listing of combinations and the numbers of actions of the pressure cylinders 5, 6 and 7 are only illustrative since a great deal more than the five mentioned can be made. The numbers of commutations and permutations based upon the matrix of the multi position switch V and the operation of the relays, are a great deal more than five. It is further possible to enlarge the usefulness of the machine to unlimited numbers by the addition of additional cylinders or combined with interrelated and interworking circuitry. The enlargement of the machine from the illustrated embodiment will be obvious to those skilled in the present art.

It is further noted that the adjustment wheel 4 makes it possible to slide the entire supporting frame 3 carrying all of the cylinders so that the traverse of the cylinders and the height of the top and bottom dead centers of the cylinders can be adjusted while keeping the original value of the stroke length of the pistons 31. On the other hand the adjustment of the sleeve 26 carrying the upper end of the piston rods 8 will allow the height of each of the pistons 31 to be varied with regard to their top and bottom centers. Thus, a high degree of variation and modification is possible. It will also be obvious that in the same manner as the upper portion of each of the cylinders is provided with a sleeve 26 the lower frontal end corresponding to the end 25 could also be provided with an adjustable sleeve. It would thus be possible to change not only the top dead center but also the position of the bottom dead center of the piston so that even the further adjustment of the stroke would be possible. Thus the stroke of each of the pistons can be individually adjusted to accommodate for its stroke to the thickness and dimension and rigidity of the shoe upper part work piece so as to optimize the quality of the welded seam.

Various changes, modifications and embodiments have been suggested in this disclosure. The present disclosure and drawings are intended to be illustrative only and not to be limiting of the scope of the present invention.

What is claimed is:

1. Apparatus for the high frequency welding of articles such as shoe parts and the like comprising a table for receiving said shoe parts, a frame extending above said table, a plurality of pressure cylinders arranged on said frame having piston rods extending downwardly therefrom, means for actuating said cylinders to extend said rods toward said table, means for removably mounting to the ends of selected ones of said piston rods either an electrode or a clamp, a terminal board mounted on said frame and connected to a source of current, first contacts adapted to be mounted on respective ones of said piston rods and extend therefrom toward said terminal board, second contacts adapted to be mounted on said terminal board, each of said second contacts being adapted to extend from said terminal board in association with a selected one of said first contacts, at least one of each of said associated first and second contacts being removably mounted respectively to said piston rod and terminal board so as to permit engagement of said contacts in association with selected ones of said piston rods, said terminal board being arranged on said frame so that the first and second contacts engage at the bottommost dead center position of said piston rods.

2. The apparatus according to claim 1 wherein said first contact comprises a spring and said second contacts are adjustably positioned along said terminal board in locations corresponding to selected ones of said pistons.

3. The apparatus according to claim 1 including circuit means for cyclically operating said piston rods to which electrodes are attached to move said electrodes into contact with the shoe parts, comprising valve means for actuating said respective piston rods, a pair of connecting relays having contacts operating said valve means, a multi position switch for selecting predetermined ones of said relay contacts according to a predetermined order of operation, a central control switch, a toggle circuit connected to said central control switch said central control switch having a governing relay, said governing relay having contacts for selectively operating said connecting relays on operation of said toggle circuit, said connecting relays having normally open contacts interposed in series between the control switch and the governing relay arranged in parallel to said control switch, a microswitch associated with each of said pistons and closable upon descent thereof, said microswitches being interposed between the source of current and the corresponding piston rods to which an electrode is attached to permit current to flow only when said corresponding piston rod is in its downmost position.

4. The apparatus according to claim 1 wherein each of said cylinders includes an axially extending sleeve in which the piston rod is housed, said sleeve being threaded on its external surface and provided with a regulating nut threadably mounted thereon, said nut being adjustable to vary the axial position of said sleeve relative to said cylinder.

5. Apparatus according to claim 1 wherein each of said pressure cylinders is formed with a stepped bore of smaller diameter at each of its frontal ends, a throttling port extending from each of said bores and the piston rod carries a piston having flanking portions adapted to fit within the reduced bores whereby the fluid within said cylinder is meted outwardly of said throttling port.

* * * * *